(12) United States Patent
Kueh

(10) Patent No.: US 8,793,736 B2
(45) Date of Patent: Jul. 29, 2014

(54) SYSTEM AND METHOD FOR DISPLAYING A MAPPING OF CHANNELS IN A PROGRAM GUIDE

(75) Inventor: Anthony Kueh, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 324 days.

(21) Appl. No.: 12/399,352

(22) Filed: Mar. 6, 2009

(65) Prior Publication Data

US 2010/0229195 A1 Sep. 9, 2010

(51) Int. Cl.
| | |
|---|---|
| G06F 3/00 | (2006.01) |
| G06F 13/00 | (2006.01) |
| H04N 5/445 | (2011.01) |
| H04N 21/462 | (2011.01) |
| H04N 21/414 | (2011.01) |
| H04N 21/45 | (2011.01) |
| H04N 21/482 | (2011.01) |
| H04N 21/84 | (2011.01) |

(52) U.S. Cl.
CPC ..... *H04N 21/4622* (2013.01); *H04N 21/41407* (2013.01); *H04N 21/4524* (2013.01); *H04N 21/482* (2013.01); *H04N 21/4821* (2013.01); *H04N 21/4823* (2013.01); *H04N 21/462* (2013.01); *H04N 21/84* (2013.01)
USPC ............ 725/49; 725/37; 725/38; 725/39; 725/40; 725/46; 725/48

(58) Field of Classification Search
CPC ............... H04N 21/41407; H04N 21/4524; H04N 21/462; H04N 21/4622; H04N 21/482; H04N 21/4821; H04N 21/4823; H04N 21/84
USPC ............................. 725/37, 38, 48, 49, 74–77
See application file for complete search history.

(56) References Cited

U.S. PATENT DOCUMENTS

| | | | |
|---|---|---|---|
| 6,075,570 A | 6/2000 | Usui et al. | |
| 6,934,963 B1* | 8/2005 | Reynolds et al. | 725/39 |
| 7,024,676 B1* | 4/2006 | Klopfenstein | 725/49 |
| 2003/0051246 A1* | 3/2003 | Wilder et al. | 725/49 |

(Continued)

FOREIGN PATENT DOCUMENTS

| | | |
|---|---|---|
| JP | 2006279860 | 10/2006 |
| JP | 2007251260 | 9/2007 |

OTHER PUBLICATIONS

International Search Report, PCT/US2010/026396, International Searching Authority, European Patent Office, Jun. 28, 2010.

(Continued)

*Primary Examiner* — Jeremy Duffield
(74) *Attorney, Agent, or Firm* — The Marbury Law Group, PLLC

(57) ABSTRACT

A system and method for displaying an electronic program guide are disclosed. In one embodiment the method comprises receiving, for a plurality of first events, first event metadata comprising a first event description and a first logical channel number, receiving, for a plurality of second events, second event metadata comprising a second event description and a second logical channel number, assigning the first logical channel number associated with a particular first event to a particular second event, wherein the assignment is based on the first event metadata of the particular first event and the second event metadata of the particular second event, and displaying a program guide comprising at least a portion of the second event metadata of the particular second event.

26 Claims, 9 Drawing Sheets

| | 8:00 | 8:30 | 9:00 | 9:30 |
|---|---|---|---|---|
| NBC (4) | Chuck [3] OR Heroes [2] | | Heroes [2-8:00] | |
| Fox (5) | NA: Terminator: The Sarah Connor Chronicles | | NA: Prison Break | |
| CW (6) | NA: Gossip Girl | | NA: Privileged | |
| CBS (8) | NA: The Big Bang Theory | (9:00)How I Met Your ... | (9:30)Two and a Half Men | NA: Worst Week |
| PBS (9) | Antiques Roadshow [4] {NA: Pledge Programming} | | Antiques Roadshow [4] | |
| PBS (9) | | | Antiques Roadshow [4-8:00] | |
| X1 (101) | News [1] | | News [1] | |
| X2 (102) | | | Grey's Anatomy [3] | |

(56) References Cited

U.S. PATENT DOCUMENTS

| | | |
|---|---|---|
| 2005/0128351 A1* | 6/2005 | Yamamoto et al. ............ 725/109 |
| 2006/0037046 A1 | 2/2006 | Simms et al. |
| 2006/0174269 A1* | 8/2006 | Hansen-Turton ................ 725/39 |
| 2007/0129003 A1* | 6/2007 | Dunko ............................ 725/62 |
| 2009/0133073 A1* | 5/2009 | DaLaCruz et al. .............. 725/49 |
| 2009/0187948 A1* | 7/2009 | Malik .............................. 725/49 |
| 2010/0023975 A1* | 1/2010 | Gupta et al. .................... 725/62 |
| 2010/0125865 A1* | 5/2010 | Ospalik et al. .................. 725/25 |
| 2010/0138855 A1* | 6/2010 | Sofos et al. ..................... 725/28 |

OTHER PUBLICATIONS

Written Opinion, PCT/US2010/026396, International Searching Authority, European Patent Office, Jun. 28, 2010.

International Preliminary Report on Patentability—PCT/US2010/026396, The International Bureau of WIPO—Geneva, Switzerland, Jun. 27, 2011.

* cited by examiner

|  | 8:00 | 8:30 | 9:00 | 9:30 |
|---|---|---|---|---|
| NBC (4) | Chuck || Heroes ||
| Fox (5) | Terminator: The Sarah Connor Chronicles || Prison Break ||
| CW (6) | Gossip Girl || Privileged ||
| CBS (8) | The Big Bang Theory | How I Met Your Mother | Two and a Half Men | Worst Week |
| PBS (9) | Pledge Programming || Antiques Roadshow ||

*FIG. 3A*

|  | 8:00 | 8:30 | 9:00 | 9:30 |
|---|---|---|---|---|
| ABC (2) | Charlie Brown Christmas || Boston Legal ||
| CW (3) | Gossip Girl || Privileged ||
| Fox (4) | Terminator: The Sarah Connor Chronicles || Prison Break ||
| ESPN (5) | Monday Night Football ||||
| CBS (6) | The Big Bang Theory | How I Met Your Mother | Two and a Half Men | Worst Week |

*FIG. 3B*

|  | 8:00 | 8:30 | 9:00 | 9:30 |
|---|---|---|---|---|
| NBC (4)[0] | NOT AVAILABLE ||||
| Fox (5)[4] | Terminator: The Sarah Connor Chronicles || Prison Break ||
| CW (6)[3] | Gossip Girl || Privileged ||
| CBS (8)[6] | The Big Bang Theory | How I Met Your Mother | Two and a Half Men | Worst Week |
| PBS (9)[0] | NOT AVAILABLE ||||
| ABC (101)[2] | Charlie Brown Christmas || Boston Legal ||
| ESPN (102)[5] | Monday Night Football ||||

FIG. 3C

| Current Network | Home Network |
|---|---|
| 0 | 4 |
| 0 | 9 |
| 2 | 101 |
| 3 | 6 |
| 4 | 5 |
| 5 | 102 |
| 6 | 8 |

FIG. 4A

| Home Network | Current Network |
|---|---|
| 4 | 0 |
| 5 | 4 |
| 6 | 3 |
| 8 | 6 |
| 9 | 0 |
| 101 | 2 |
| 102 | 5 |

FIG. 4B

|  | 8:00 | 8:30 | 9:00 | 9:30 |
|---|---|---|---|---|
| NBC (4) | Chuck | | Heroes | |
| Fox (5) | Terminator: The Sarah Connor Chronicles | | Prison Break | |
| CW (6) | Gossip Girl | | Privileged | |
| CBS (8) | The Big Bang Theory | How I Met Your Mother | Two and a Half Men | Worst Week |
| PBS (9) | Pledge Programming | | Antiques Roadshow | |

*FIG. 5A*

|  | 8:00 | 8:30 | 9:00 | 9:30 |
|---|---|---|---|---|
| BBC-1(1) | News | | News | |
| BBC-2 (2) | Heroes | | How I Met Your Mother | Two and a Half Men |
| BBC-3 (3) | Chuck | | Grey's Anatomy | |
| Chan 4 (4) | Antiques Roadshow | | Antiques Roadshow | |

*FIG. 5B*

|  | 8:00 | 8:30 | 9:00 | 9:30 |
|---|---|---|---|---|
| NBC (4) | Chuck [3] OR Heroes [2] | | Heroes [2-8:00] | |
| Fox (5) | NA : Terminator: The Sarah Connor Chronicles | | NA : Prison Break | |
| CW (6) | NA : Gossip Girl | | NA : Privileged | |
| CBS (8) | NA : The Big Bang Theory | (9:00)How I Met Your ... | (9:30)Two and a Half Men | NA : Worst Week |
| PBS (9) | Antiques Roadshow [4] {NA: Pledge Programming} | | Antiques Roadshow [4] | |
| PBS (9) | | | Antiques Roadshow [4-8:00] | |
| X1 (101) | News [1] | | News [1] | |
| X2 (102) | | | Grey's Anatomy [3] | |

*FIG. 5C*

SYSTEM AND METHOD FOR DISPLAYING A MAPPING OF CHANNELS IN A PROGRAM GUIDE

BACKGROUND

Mobile electronic devices such as telephone handsets, personal media players, and the like may be configured to wirelessly receive and present to a user multimedia programming including sports, entertainment, informational programs, and other types of audio and/or video data. The multimedia programming may be communicated via a broadcast communications link to the electronic devices. Examples of broadcasting systems specified for mobile devices include: MediaFLO, DVB-H, and 1SEG.

Existing mobile broadcasting standards specify an electronic program guide (EPG), also called an interactive program guide (IPG), electronic service guide (ESG), or electronic media guide (EMG). An EPG is generally an interactive display that describes the schedule of multimedia programming and allows a user to select a program to display. EPGs typically include functions allowing a viewer to navigate, select, and discover content by time, title, channel, genre, etc. by use of their remote control, a keyboard, or other input devices such as a telephone keypad.

Existing mobile EPGs are designed based on non-mobile counterparts from the cable or satellite systems. In such systems users rarely, if ever move their equipment about. Therefore, existing EPGs do not typically account for users moving between broadcast regions. The present inventor has recognized a need to improve EPGs to account for the mobile nature of mobile broadcasting.

SUMMARY

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Embodiments" one will understand how the features of this invention provide advantages that include an electronic program guide derived from program guide information from multiple sources.

One aspect of the development is a method of displaying a program guide, the method comprising receiving, for a plurality of first events, first event metadata comprising a first event description and a first logical channel number, receiving, for a plurality of second events, second event metadata comprising a second event description and a second logical channel number, assigning the first logical channel number associated with a particular first event to a particular second event, wherein the assignment is based on the first event metadata of the particular first event and the second event metadata of the particular second event, and displaying a program guide comprising at least a portion of the second event metadata of the particular second event.

Another aspect of the development is a system for displaying a program guide, the system comprising a receiver configured to receive, for a plurality of first events, first event metadata comprising a first event description and a first logical channel number and to receive, for a plurality of second events, second event metadata comprising a second event description and a second logical channel number, a processor configured to assigning the first logical channel number associated with a particular first event to a particular second event, wherein the assignment is based on the first event metadata of the particular first event and the second event metadata of the particular second event, and a display configured to display a program guide comprising at least a portion of the second event metadata of the particular second event.

BRIEF DESCRIPTION OF THE DRAWINGS

FIG. 3A is a diagram of an exemplary electronic program guide (EPG) based on EPG data received from a first distribution system.

FIG. 3B is a diagram of an exemplary EPG based on EPG data received from a second distribution system.

FIG. 3C is a diagram of an exemplary EPG based on the EPG data received from both the first and second distribution system.

FIG. 4A is a diagram of a channel mapping between two distribution systems arranged according to a current distribution system.

FIG. 4B is a diagram of a channel mapping between two distribution systems arranged according to a home distribution system.

FIG. 5A is a diagram of an exemplary electronic program guide (EPG) based on EPG data received from a first distribution system.

FIG. 5B is a diagram of an exemplary EPG based on EPG data received from a second distribution system.

FIG. 5C is a diagram of an exemplary EPG based on the EPG data received from both the first and second distribution system.

DETAILED DESCRIPTION

The following detailed description is directed to certain specific aspects of the invention. However, the invention can be embodied in a multitude of different ways, for example, as defined and covered by the claims. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Figure 1:
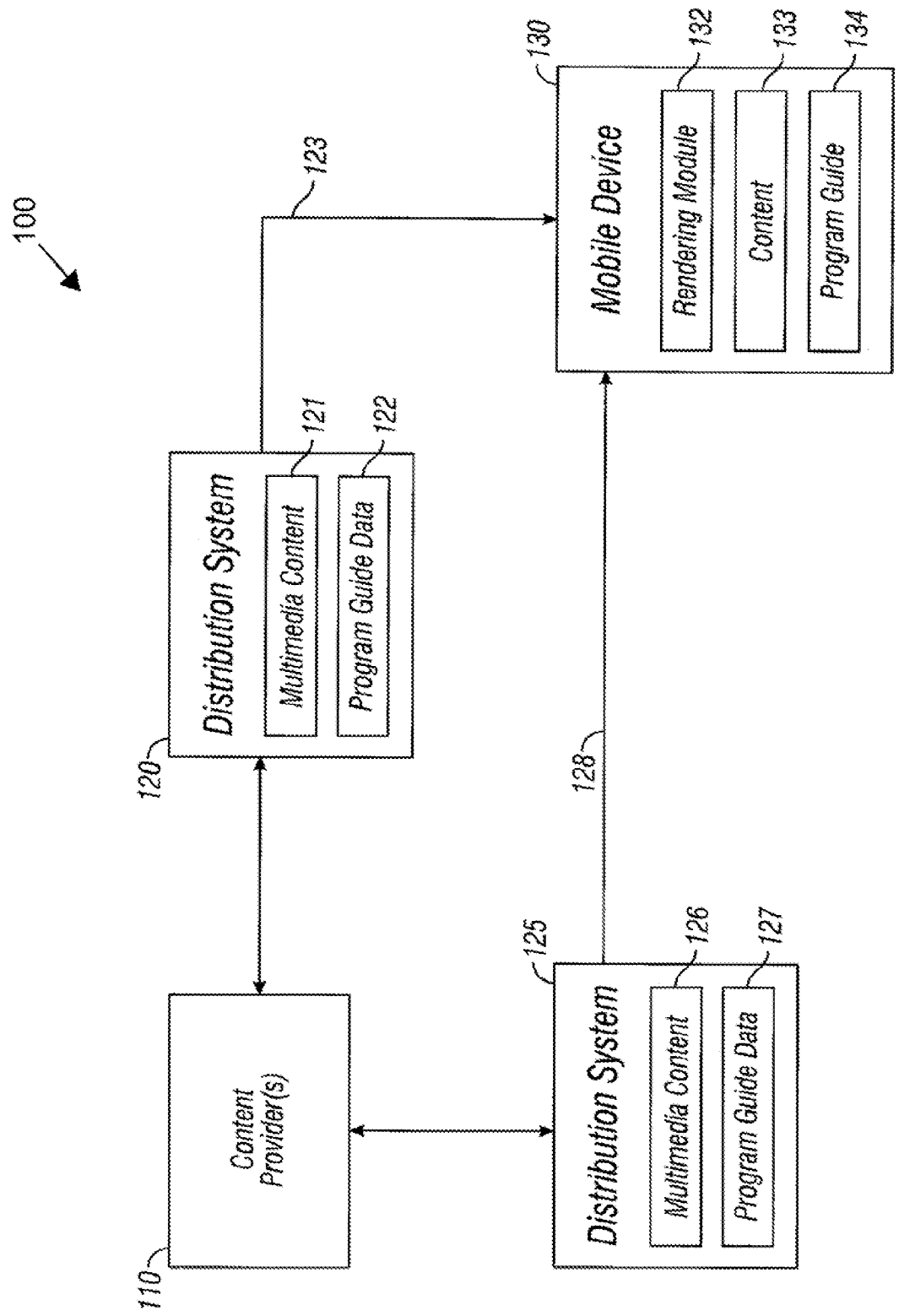
FIG. 1 is a block diagram illustrating an exemplary system for providing broadcast programming.

Some mobile devices, such as a mobile telephone or a hand-held media player, are configured to receive and present broadcast programming. FIG. 1 is a block diagram illustrating an exemplary system 100 for providing broadcast programming from a content provider 110 to a mobile device 130 via one or more distribution systems 120, 125. Although only one content provider 110 is shown in FIG. 1, embodiments of the system 100 can be configured to use any number of content providers. Similarly, although only two distribution systems 120, 125 and one mobile device 130 are shown in FIG. 1, embodiments of the system 100 can be configured to use any number of distribution systems or mobile devices.

Data representing multimedia content items is transmitted from the content providers 110 to one or more of the distribution systems 120, 125. In some embodiments, the multimedia content received by the first distribution system 120 and second distribution system 125 is the same. In other embodiments, the multimedia content received differs. For example, in one embodiment, the first distribution system 120 is located in New York and receives data representing a broadcast of a football game between the New York Giants and the New York Jets, whereas the second distribution system 125 is located in Texas and receives data representing a broadcast of a football game between the Dallas Cowboys and the Houston Texans. The multimedia content received by the first distribution system 120 and second distribution system 125 can overlap. For example, with respect to the above-described embodiment, both systems 120, 125 can receive data representing a broadcast of the Superbowl. Similarly, in some embodiments, the set of content providers 110 in communication with the first distribution system 120 is different from the set of content providers 110 in communication with the second distribution system 125.

The multimedia content items can be communicated to the mobile device 130 by one or more of the distribution systems 120, 125 over a wired or wireless communication link 123, 128. In the exemplary system 100, the content item communication links 123, 128 are illustrated as a uni-directional network to each of the mobile devices 130. However, one or more of the communication links 123, 128 can be a fully symmetric bi-directional network. In this case, the receiver 224 of FIG. 2, described in detail below, can act as both a transmitter and a receiver.

The communication links 123, 128 can comprise one or more wired and/or wireless links, including one or more of a Ethernet, telephone (e.g., POTS), cable, power-line, and fiber optic systems, and/or a wireless system comprising one or more of a code division multiple access (CDMA or CDMA2000) communication system, a frequency division multiple access (FDMA) system, a time division multiple access (TDMA) system such as GSM/GPRS (General Packet Radio Service)/EDGE (enhanced data GSM environment), a TETRA (Terrestrial Trunked Radio) mobile telephone system, a wideband code division multiple access (WCDMA) system, a high data rate (1xEV-DO or 1xEV-DO Gold Multicast) system, an IEEE 802.11 system, a MediaFLO™ system, a DMB system, an orthogonal frequency division multiple access (OFDM) system, or a DVB-H system.

The multimedia content items received by the distribution systems 120, 125 can be immediately broadcast to the mobile device 130 or stored in a multimedia content database 121, 126 of the distribution systems 120, 125 for distribution at later times. In addition to communicating content to the mobile device 130, the distribution systems 120, 125 can also communicate data regarding an electronic program guide (EPG), which can be stored in an EPG database 122, 127 of the distribution systems 120, 125. The distribution systems 120, 125 can receive programming schedule data and content-related data from the content provider 110 and/or other sources and can communicate the EPG data to the mobile device 130.

The EPG can include data related to the broadcast schedule of multiple broadcasts of particular content items available to be received over the communication link 123, 128. The EPG data may include titles of content items, start and end times of particular broadcasts, category classification of programs (e.g., sports, movies, comedy, etc.), quality ratings, adult content ratings, etc. The EPG can be communicated to the mobile device 130 over the program communication link 123, 128 and can be stored on the mobile device 130.

The mobile device 130 can also include a multimedia rendering module 132 configured to render the multimedia content items received over the content item communication link 123, 128 and stored within a multimedia content storage 133. The multimedia rendering module 132 can include analog and/or digital technologies. The multimedia rendering module 132 can include one or more multimedia signal processing systems, such as video encoders/decoders, using encoding/decoding methods based on international standards such as MPEG-x and H.26x standards. Such encoding/decoding methods generally are directed towards compressing the multimedia data for transmission and/or storage.

The mobile device 130 can also include an EPG rendering module 134 configured to render an EPG based on the EPG data received from one or more distribution systems 120, 125. The EPG can be an on-screen guide to scheduled multimedia content, and can include functionality allowing a user to navigate, select, and discover content by time, title, channel, genre, etc. by use of a remote control, a keyboard, or other input devices such as a phone keypad. The EPG rendering module 134 can also be configured to receive and compile EPG data from multiple sources. The EPG rendering module 134 can be configured to perform one or more of the methods 600, 700, 800 of displaying a program guide described below with respect to FIGS. 6, 7, and 8.

Figure 2:
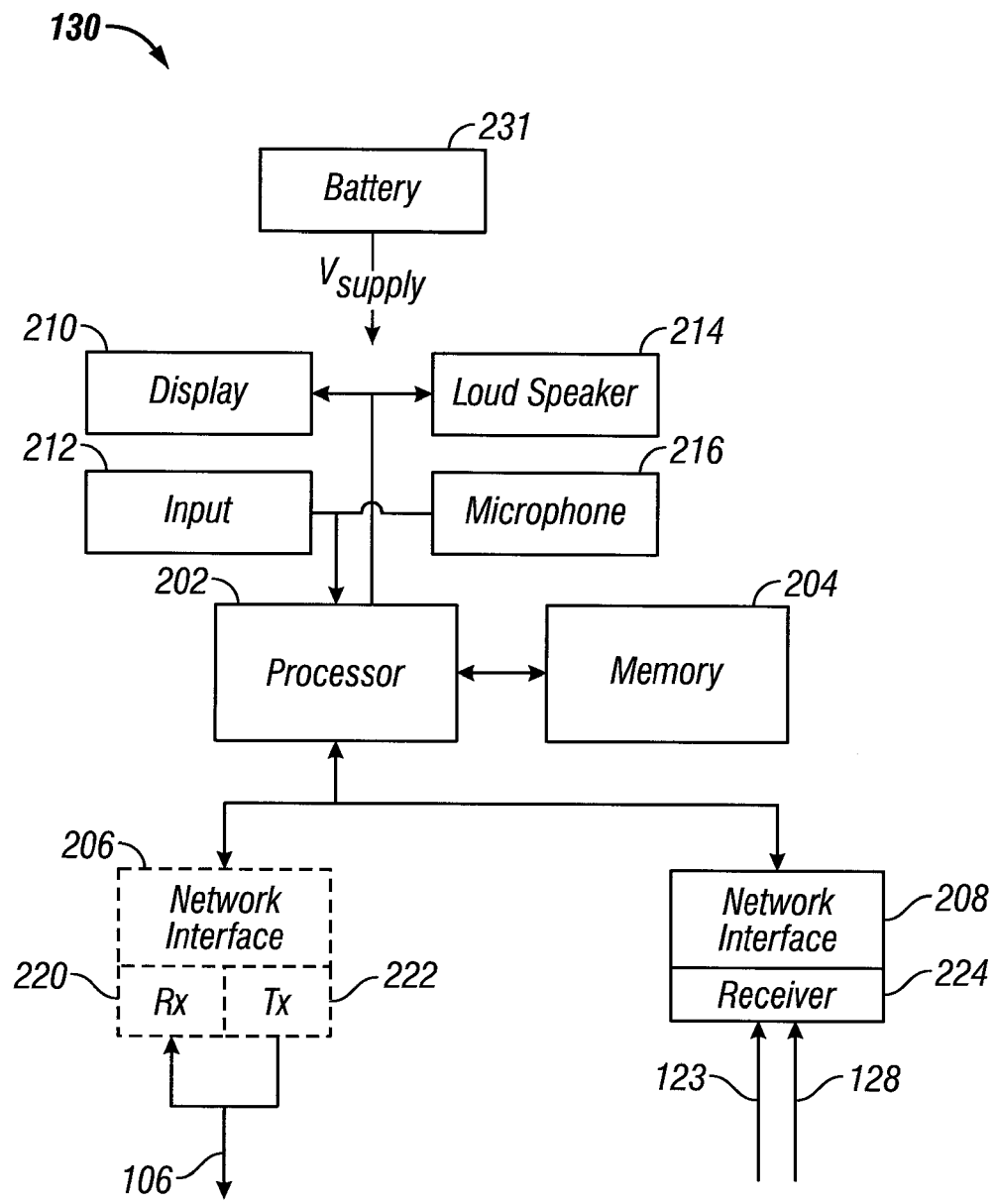
FIG. 2 is a block diagram illustrating an exemplary mobile device, such as that illustrated in FIG. 1.

The mobile device 130 can be embodied as a consumer electronics (CE) item, including a cellular telephone, a smart-phone, a personal digital assistant (PDA), a personal computer, a laptop computer, a television set, a portable television, a portable media player, a radio, or a vehicular entertainment system. FIG. 2 is a block diagram illustrating an exemplary mobile device 130 such as that illustrated in FIG. 1. The mobile device 130 can include a processor 202 that is in communication with a memory 204 and a network interface 208 that communicates over a communication link.

The network interface 208 includes a receiver 224 configured to receive one or more unidirectional communication links 123, 128. The network interface 208 and receiver 224 may receive signals according to wired technologies including Ethernet, telephone (e.g., POTS), cable, power-line, and fiber optic systems, and/or wireless technologies comprising one or more of a code division multiple access (CDMA or CDMA2000) communication system, a frequency division multiple access (FDMA) system, a time division multiple access (TDMA) system such as GSM/GPRS (General Packet Radio Service)/EDGE (enhanced data GSM environment), a TETRA (Terrestrial Trunked Radio) mobile telephone system, a wideband code division multiple access (WCDMA) system, a high data rate (1xEV-DO or 1xEV-DO Gold Multicast) system, an IEEE 802.11 system, a MediaFLO™ system, a DMB system, an orthogonal frequency division multiple access (OFDM) system, or a DVB-H system.

The mobile device 130 can include an optional second network interface 206 for communicating via a bi-directional communication link 106. The network interface 206 can include any suitable antenna (not shown), a receiver 220, and a transmitter 222 so that the mobile device 130 can communicate with one or more devices over the second communication link 106. Optionally, the network interface 206 can also have processing capabilities which reduce processing requirements of the processor 202.

The mobile device 130 can also include or be operatively connected to one or more of a display 210, a user input device 212, a loudspeaker 214 and/or a microphone 216. The mobile device 130 can also include a separate battery 231 to provide power to one or more components of the device 130. Input devices suitable for use in embodiments include, but are not limited to, a keyboard, buttons, keys, switches, a pointing device, a mouse, a joystick, a remote control, an infrared detector, a video camera (possibly coupled with video processing software to, e.g., detect hand gestures or facial gestures), a motion detector, or a microphone (possibly coupled to audio processing software to, e.g., detect voice commands).

The mobile device 130 may be implemented in a variety of ways. Referring to FIG. 2, the device 130 is represented as a series of interrelated functional blocks that may represent functions implemented by, for example the processor 202, software, some combination thereof, or in some other manner as taught herein. For example, the processor 202 may facilitate user input via the input devices 212. Further, the transmitter 222 may comprise a processor for transmitting that provides various functionalities relating to transmitting information to another mobile device 130.

Certain functionalities of the processor 202 have been described with respect to FIG. 1, including the receiving, processing, and display of multimedia or EPG data. The processor 202 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A general purpose processor may be a microprocessor such as an ARM, Pentium®, Pentium II®, Pentium III®, Pentium IV®, Pentium® Pro, an 8051, a MIPS®, a Power PC®, an ALPHA®, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. For example, the processor can comprise a Qualcomm CDMA Technologies (QCT) chipset, such as from the Mobile Station Modem (MSM) chipset family.

The steps of a method or algorithm described in connection with the embodiments disclosed herein may be embodied directly in hardware, in a software module executed by a processor, or in a combination of the two. A software module may reside in any suitable computer readable medium, such as the storage 204. The storage 204 can include, but is not limited to, a volatile or non-volatile memory such as a DRAM memory, flash memory, registers, one or more hard disks, a removable disk, or any other form of suitable storage medium known in the art. An exemplary storage medium is coupled to the processor such the processor can read information from, and write information to, the storage medium. In the alternative, the storage medium may be integral to the processor. The processor and the storage medium may reside in an ASIC or in any suitable commercially available chipset.

The mobile device 130 can be configured to receive data concurrently from one or more of the communication links 106, 123, 128 shown in FIG. 2. In other embodiments, the mobile device 130 is configured to receive data from only one link at a time. For example, the processor 202 may be incapable of performing the receiving and/or transmitting functions of the bidirectional network interface 206 at the same time that the broadband unidirectional interface 208 is receiving over a program communication link 123, 128. Thus, for example, in one embodiment, reception or display of a broadcast of a program may be discontinued over the program communication link 123, 128 when a signal, e.g., a telephone call for example, is received over the communication link 106.

The mobile device 130 may be implemented using any suitable combination of the functions and components discussed with reference to FIG. 2. In one example of the device 130, the device 130 may comprise one or more integrated circuits. Thus, such integrated circuits may comprise one or more processors that provide the functionality of the processor 202 illustrated in FIG. 2. The integrated circuit may comprise other types of components that implement some or all of the functionality of the illustrated processor components. Further, one or more processors may implement the functionality of the illustrated processor components.

As mentioned above, a particular mobile device can receive multimedia content and EPG data from more than one source. For example, the mobile device 130 of FIG. 1, may receive multimedia content and EPG data from the first distribution system 120 and the second distribution system 125. In one embodiment, the mobile device 130 receives data from the first distribution system 120 at a first time and receives data from the second distribution system 125 at a second time.

The mobile device 130 may be able to receive data from the first distribution system 120 at a first time, but unable to receive data from the first distribution system 120 at a second time at which it is able to receive data from the second distribution system 125. For example, the mobile device 130 may, at the first time, be in a first location where it can receive data from the first distribution system 120, but may, at the second time, be in a second location where it is out of range of the first distribution system 120. At this second location, however, the mobile device 130 may be in range of, and able to receive data from, the second distribution system 125. Such a scenario could occur if the user of a mobile device configured to receive terrestrial broadcast data, such as a portable television, traveled from a first location where local broadcast stations were received to a second location where different local broadcast stations were received.

In another embodiment, the mobile device 130 accesses the first distribution system 120 at the first time, and at the second time, even though it could still access the first distribution system 120, accesses the second distribution system 125 instead. For example, a cost associated with accessing the distribution systems 120, 125 may differ at different times, causing a user of the mobile device 130 to choose different distribution systems at different times. As an example, a user of the mobile device 130 may subscribe to the first distribution system 120 for a period of years and then, based on a new pricing plan offered by the second distribution system 125, cancel subscription to the first distribution system 120 and begin receiving data from the second distribution system 125. As another example, the first distribution system 120 may charge a certain amount for hourly access during the day and a different amount for hourly access at night, whereas the second distribution system 125 charges a fixed hourly rate. At certain times of the day or night, it may be more cost-effective to access the first distribution system 120 or the second distribution system 125.

In yet another embodiment, the mobile device 130 accesses both the first distribution 120 and the second distribution system 125 simultaneously. The receiver 224, network interface 208, and processor 202 may include particular functionalities to integrate the data received from the multiple distribution systems 120, 125, including functionalities to integrate EPG data from multiple sources into a single EPG.

EPG data can be transmitted in a number of different ways, and in a number of different formats. EPG data can be transmitted within a broadcast transport stream or alongside it in a different physical channel. For example, with respect to FIG. 1, the distribution systems 120, 125 can transmit EPG data over the communication links 123, 128. EPG data can also be retrieved by the mobile device 130 of FIG. 1 or from other sources, such as third-party 'metadata aggregators' (including Tribune TV Data, Gemstar-TV Guide in the U.S. and Europe, and Broadcasting Data Services in Europe). EPG data can also be retrieved over an Internet feed, enabling two-way interactivity for the user.

EPG data can be stored and transmitted by each distribution system 120, 125 according to the Advanced Television Systems Committee (ATSC) standard, which uses tables sent via the Program and System Information Protocol (PSIP). These tables can contain program start times, program titles, and addition program details. EPG data could also be stored according to a proprietary protocol or different standard.

PSIP data transmitted over a physical channel (e.g., a wired or wireless communication link) contains data regarding one or more logical channel numbers, or virtual channels, being transmitted over the physical channel. The PSIP data further defines events, multimedia programming, associated with each logical channel number. For example, satellite radio operates on the 2.3 GHz S-band in North America, which is a single physical channel, but the digital data transmitted defines hundred of different 'stations,' or logical channel numbers, each logical channel number associated with different music, or different events. Similarly, satellite television operates on the Ku-band and Ka-band, but transmits hundreds of different channels, each with their own programming.

In general, EPG data associates events, representative of multimedia content, with different logical channel numbers. In one embodiment, EPG data associates a number of events, representing music streams (e.g., Top 40, Classical, Pop, and R&B), to a number of logical channel numbers (e.g., 1, 2, 3, and 4). EPG can data further associate a start time and duration with each event, or a subset thereof. Thus, in another embodiment, EPG data associates a number of events, representing television programs (e.g., Chuck from 8 to 9, Heroes from 9 to 10, and Prison Break from 9 to 10), to a number of logical channel numbers (e.g., 4, 4, and 5).

EPG data can associate other data with the logical channel numbers. For example, each logical channel number can be associated with a channel name, call letters, a short channel name, a logo, a content rating, or a genre. As an example, logical channel number 4 may be associated with the channel name NBC Hollywood Channel 4, the call letters KNBH, the short channel name NBC, and the peacock logo. Adult content ratings may be associated with particular logical channel numbers, overriding content ratings of particular events, or filling in when content ratings are not present for particular events. A logical channel number may also be associated with a genre, such as sports or movies.

EPG data can also associate other data with an event. For example, each event can be associated with a title, an episode number, an original air date, a detailed description, a content rating, a quality rating, a production network, or a genre. For example, an event associated with logical channel number 4, further associated with a start time of 8:00 pm and duration of one hour, may be associated with the title "Chuck," episode number 210, and an original air date Dec. 8, 2008. The event may further have a detailed description of the event, including stars, guest stars, plot synopsis, etc. The event may have a content rating, including an MPAA content rating (G, PG, PG-13, R, NC-17, etc.) or a TV parental guidelines rating (TV-Y, TV-G, TV-PG, TV-MA, etc.). The event may be associated with a quality rating relating to an objective assessment of the quality of the content such as a rating between 1 and 5 stars, a number of "thumbs up," or a rating between 1 and 10. The event may be associated with a particular production network. For example, the EPG data may indicate the broadcast network upon which the event originally aired. For example, though Friends is syndicated on a number of channels, it originally ran on NBC. An event can also be associated with a genre, such as sports, drama, movies, etc.

The EPG data can be received and interpreted to display an EPG to a user. The interpretation can be performed by an application residing within middleware in a set-top box which connects to a television set and enables the application to be displayed. Alternatively, the interpretation can be performed by the program guide module 134 within the mobile device 130 of FIG. 1.

An EPG can comprise a graphical user interface which enables the display of program titles, descriptive information such as a synopsis, actors, directors, year of production, etc., a logical channel number and associated name, program start times, and other metadata. EPG data can be displayed on a grid with the option to select more information on each event. Radio EPGs can offer text-based displays of program name, description, genre, on-air or off-air, artist, album, track title, etc.

FIG. 3A is a diagram of an exemplary electronic program guide (EPG) based on EPG data received from a first distribution system. Although FIG. 3A only shows five logical channels and a two-hour time span, it is understood that other EPGs can display any number of channels and a longer or shorter time span. An EPG can also have the option of displaying additional data by scrolling in logical channel number or time. The exemplary EPG of FIG. 3A displays a number of events in a grid, indicating for each event an associated logical channel number and time of airing. The event is associated by the illustrated EPG with a logical channel number by virtue of being located in the same row of grid. Other methods of visual association are possible. The EPG also displays a channel name for each logical channel number.

FIG. 3B is a diagram of an exemplary EPG based on EPG data received from a second distribution system. The format of the EPG of FIG. 3B is similar to that of the EPG of FIG. 3A in that it displays a number of events in a grid, indicating for each event an associated logical channel number and time of airing. However, as the EPG of FIG. 3B is based on different EPG data, from a second distribution system, the displayed content differs. It is to be appreciated that, although logical channel number 8 of the EPG of FIG. 3A and logical channel number 6 of the EPG of FIG. 3B are both named "CBS," these two channels can be different and can contain different events. For example, CBS (6) of the EPG of FIG. 3A may be a CBS affiliate based in New York (with call letters WRGB), whereas CBS (8) of the EPG of FIG. 3B may be a CBS affiliate based in San Diego (with call letters KFMB). The two stations can air different events at different times. Similarly, although the 8:00-8:30 time slot of both logical channel numbers contains an event entitled "The Big Bang Theory," these can be different events, as they may contain different commercials, may include different watermarks, or may be different episodes.

The user experience on a mobile device may be degraded due to switching from the first distribution system to the second distribution system. For example, a user desiring to watch "Gossip Girl" as 8:00 pm may direct the mobile device to logical channel number 6, expecting to receive events from the CW (6) network. If the mobile device is receiving data from the second distribution system, the mobile device directed to logical channel number 6 would display "The Big Bang Theory" on CBS (6) at 8:00 pm. The user may give up on watching her or her preferred event, or may be burdened with searching for the appropriate logical channel number.

FIG. 3C is a diagram of an exemplary EPG based on the EPG data received from both the first and second distribution system. The format of the EPG is similar to those of FIGS. 3A and 3B in that the EPG of FIG. 3C displays a number of events in a grid. The EPG of FIG. 3C displays events based on the event data from the second distribution system arranged according the logical channel numbers of the first distribution system. In one embodiment, the system, such as the mobile device 130 of FIG. 1, receives a channel mapping associating logical channel numbers from the first distribution system 120 to logical channel numbers of the second distribution system 125 (or vice versa).

FIGS. 4A and 4B are diagrams of channel mappings between two distribution systems. The channel mapping of FIG. 4A is arranged according to a current distribution system, whereas the channel mapping of FIG. 4B is arranged according to a home distribution system. The current distribution system corresponds to the distribution system from which the device is currently receiving data, whereas the home distribution system corresponds to a distribution system so-designated. A distribution system can be designated a home distribution system by a user of the system, or automatically when the system first acquires data from a distribution system.

In one embodiment, the channel mapping is stored in a data structure as a parallel array which associates each logical channel number in the current network to a logical channel number of the home network. The mapping may be based, for example, on an affiliated network or name associated with the logical channel number. Thus, although CW (6) of the EPG of FIG. 3A is different from CW (3) of the EPG of FIG. 3B, they are associated with each other via the channel mapping. In some cases, similar logical channel numbers will be unavailable in two different distribution systems. For example, NBC (4) of the EPG of FIG. 3A has no corresponding logical channel number in the EPG of FIG. 3B. In this case, the channel mapping may associate the logical channel number with a null value, such as zero, or simply not associate it at all. In the illustrated embodiment, logical channel numbers of the home distribution system which are unmapped are associated with the logical channel number 0, which can be interpreted by the mobile device as an unmapped channel. As another example, ABC (2) of the EPG of FIG. 3B has no corresponding logical channel number in the EPG of FIG. 3A. In this case, the channel mapping may associate the logical channel number with reserved 'roaming' logical channel numbers or simply not associate it at all.

The mapping may also be based on other characteristics of the logical channel numbers. For example, the Fox Sports Network may be available as logical channel number 20 in a first distribution network, but unavailable in a second distribution network, whereas ESPN (formerly standing for Entertainment and Sports Programming Network) is unavailable is the first distribution network, but available as logical channel number 5 in the second distribution network. The channel mapping may associate these two logical channel numbers by virtue of their similar programming (e.g., sports), despite the difference in name and affiliation.

The EPG of FIG. 3C is an exemplary result from receiving event data from the first and second distribution system and a channel mapping. The logical channel numbers are arranged according to the logical channel number from the first distribution system. In the illustrated embodiment, the logical channel number from the second distribution system is shown next to the logical channel number of the first distribution system. However, neither logical channel number need be displayed.

In the illustrated embodiment, logical channel numbers from the first distribution system which are unmapped by the channel mapping are shown as "NOT AVAILABLE." In other embodiments, unmapped logical channel numbers are not shown. In the illustrated embodiment, logical channel numbers from the second distribution system which are mapped to 'roaming' logical channel numbers are displayed at the bottom of the EPG.

Although EPG embodiments described above display events associated with a second logical channel number as though they were associated with a first logical channel number based on a channel mapping, other embodiments display events as though associated with a first channel number based on an analysis of the event itself. FIG. 5A is a diagram of an exemplary electronic program guide (EPG) based on EPG data received from a first distribution system. The EPG of FIG. 5A is identical to the EPG of FIG. 3A. FIG. 5B is a diagram of an exemplary EPG based on EPG data received from a second distribution system. The EPG of FIG. 5B differs from the EPG of FIG. 3B in that the logical channel numbers of the second EPG are not easily mapped to logical channel numbers of the first EPG. However, via an analysis of the events associated with the logical channel numbers of the second distribution system, the events can be mapped to logical channel numbers of the first distribution system.

FIG. 5C is a diagram of an exemplary EPG based on the EPG data received from both the first and second distribution systems. The EPG of FIG. 5C displays events based on the event data from the second distribution system arranged according the logical channel numbers (and associated event data) of the first distribution system. In particular, the event entitled "Chuck" is associated with logical channel number 4 in the first distribution system, but is associated with logical channel number 3 in the second distribution system. In contrast to the embodiment described with respect to FIGS. 3A-3C, the event entitled "Heroes," which is likewise associated with logical channel number 4 in the first distribution system, is not associated with the same logical channel number 3 in the second distribution system, but rather logical channel number 2 in the second distribution system. Also, the event is associated with a different timeslot.

In the illustrated embodiment, both events, which were associated with the same logical channel number in the first distribution system, but are associated with different logical channel numbers in the second distribution system, are displayed as though they were associated with the same logical channel number. As the event entitled "Heroes" is available an hour earlier, the user can have the option of viewing it at the air-time, or storing it for viewing at the start time associated with the event in the first distribution system.

The option of viewing the event entitled "Heroes" at the start time of the second distribution system is indicated in FIG. 5C by the dual listing of "Chuck" and "Heroes" at the 8:00 time slot. In an alternative EPG embodiment, the option of viewing multiple event at a single time slot can be indicated through the use of a drop-down menu.

The events entitled "How I Met Your Mother" and "Two and a Half Men," are not available for viewing or storage at the start times associated with the events in the first distribution system, thus the illustrated EPG of FIG. 5C indicates the start time at which they will be available even though they are displayed at the start times associated with the events in the first distribution system.

Events associated with logical channel numbers in the first distribution system which are not available in the second distribution system are shown in the illustrated embodiment with an indicia on unavailability. In other embodiments, the events are not shown. In some embodiments, if all events associated with a logical channel number are unavailable, the logical channel number is not shown.

The EPG of FIG. 5B indicates that two events, each entitled "Antiques Roadshow," are associated with logical channel 4 at 8:00 and 9:00 respectively. As the EPG of FIG. 5A only indicated one event with this title, associated with logical channel 9 at 9:00, there are options as to display the multiple events. In the illustrated embodiment, both events are shown in parallel copies of logical channel 9 of the first distribution system. The earlier showing is also displayed at the 8:00 time slot, which indicates through use of braces that the event is available in lieu of "Pledge Programming," which is unavailable. In other embodiments, one of the two available events of the second distribution network is selected for display. The selection can be based on other event metadata, including original airdate, episode number, etc. The selection can also be based on usage tracking. For example, the mobile device 130 of FIG. 2 may store, in memory 204, data regarding the usage of the mobile device. For example, the mobile device 130 can store which events were viewed by the user. This information can be used to select an event with closely associated metadata which the user has not recently viewed.

The second distribution system makes available events which were not available on the first distribution system, including events entitled "News" and "Grey's Anatomy." In the illustrated embodiment, these events are shown as associated with 'roaming' logical channel numbers.

In the embodiment of FIG. 3C, the logical channel number from the second distribution system is shown next to the logical channel number of the first distribution system. In the embodiment of FIG. 5C, the logical channel number from the second distribution system is shown next to each event associated with the logical channel number of the first distribution system. Other information is also shown, including the start time associated with the event in the second distribution system. In other embodiments, the logical channel numbers or the additional information is not displayed.

Figure 6:
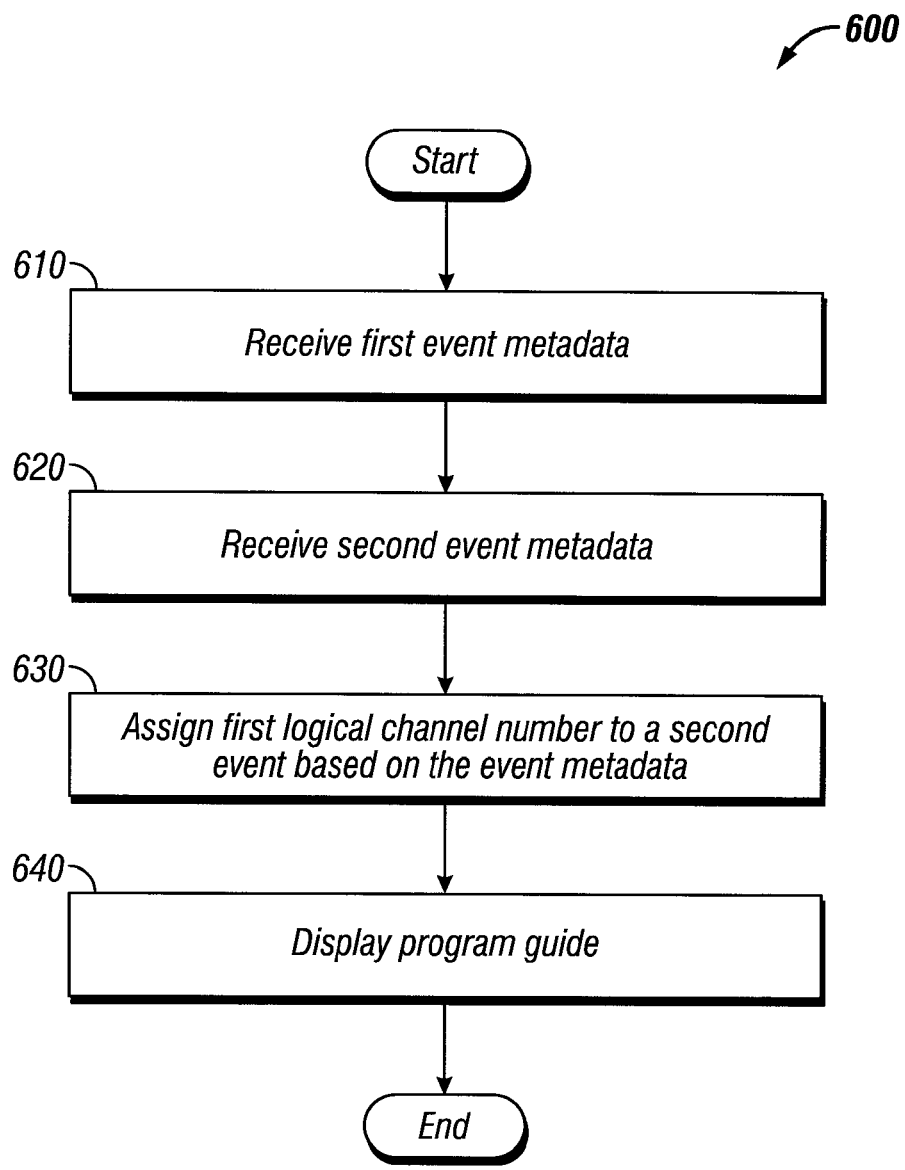
FIG. 6 is a flowchart illustrating a method of displaying a program guide according to one embodiment.

FIG. 6 is a flowchart illustrating a method of displaying a program guide according to one embodiment. The process 600 starts in block 610 with the system receiving first event metadata. The system receiving the first event metadata can be, for example, the mobile device 130, of FIG. 1. In other embodiments, the system can be a home entertainment system. In one embodiment, the first event metadata is received from the first distribution network 120 of FIG. 1. In other embodiments, the first event metadata is retrieved by the mobile device 130 from a third party 'metadata aggregator' or downloaded from the Internet. In one embodiment, the mobile device 130 of FIG. 2, receives the first event metadata via the communications link 123 through the receiver 224 and network interface 208.

The first event metadata contains information regarding a number of first events, including event descriptions or titles and the logical channel numbers associated with the events. The event metadata can be representative of multimedia content items, including audio, video, and items with both audio and video components. The first event metadata can contain additional information regarding the logical channel numbers and/or the events associated therewith. For example, each logical channel number can be associated with a channel name, call letters, a short channel name, a logo, a content rating, or a genre. As another example, each event can be associated with a title, a start time, an end time, a duration, an episode number, an original air date, a detailed description, a content rating, a quality rating, a production network, or a genre.

Moving to block 620, the system receives second event metadata. As discussed above with respect to block 610, in one embodiment the system which receives the second event metadata is the mobile device 130, of FIG. 1. In other embodiments, the system can be a home entertainment system. In one embodiment, the second event metadata is received from the second distribution network 125 of FIG. 1. In other embodiments, the second event metadata is retrieved by the mobile device 130 from a third party 'metadata aggregator' or downloaded from the Internet. In one embodiment, the mobile device 130 of FIG. 2, receives the second event metadata via the communications link 128 through the receiver 224 and network interface 208.

The second event metadata contains information regarding a number of second events, including event descriptions or titles and the logical channel numbers associated with the events. The event metadata can be representative of multimedia content items, including audio, video, and items with both audio and video components. The second event metadata can contain additional information regarding the logical channel numbers and/or the events associated therewith. For example, each logical channel number can be associated with a channel name, call letters, a short channel name, a logo, a content rating, or a genre. As another example, each event can be associated with a title, a start time, an end time, a duration, an episode number, an original air date, a detailed description, a content rating, a quality rating, a production network, or a genre.

The group of first events and group of second events can include some of the same events. In other embodiments, the group of first events and the group of second events contain similar events, which are nonetheless different. For example, both groups may contain events with the same title and episode number, but be different events due to different local commercials or different watermarks displayed over the video content.

Although blocks 610 and 620 are shown ordered, the first and second event metadata can be received in either order, simultaneously, or at overlapping time intervals. Although the first and second event metadata are received from different sources in some embodiments, such as from the first distribution system 120 and second distribution system 125 of FIG. 1, in some embodiments, the first and second event metadata are both received from the same source, such as a third party 'metadata aggregator.'

After reception of the first and second metadata in block 610 and 620 respectively, the process continues to block 630 in which the system assigns a first logical channel number to a second event based on the first and second event metadata. The system can comprise the mobile device 130 of FIG. 1, and the assignment can specifically be performed by the media guide module 134. In another embodiment, the assignment is performed by the processor 202 of FIG. 2.

Each event described by the second event metadata is, when received, associated with a second logical channel number. In block 630, one or more of the events is assigned a new logical channel number which is the same as the logical channel number of a particular first event. In one embodiment, described below with respect to FIG. 7, the assignment is based on a received channel mapping. In another embodiment, described below with respect to FIG. 8, the assignment is based on an analysis of the event metadata.

In one embodiment, the first event metadata is received in the form of tables, including a first logical channel number table, and a plurality of first event information tables. Likewise, the second event metadata is received in the form of tables, including a second logical channel number table, and a plurality of second event information tables. Each event information table contains a reference to the logical channel number table indicating a particular logical channel number.

In one embodiment, assignment of a new logical channel number to a second event includes replacing the second logical channel number table with the first logical channel number table (or a derivative thereof) and replacing the reference in the second event to the second logical channel number table with a reference to the first logical channel number table.

In another embodiment, the tables are left unchanged. In one embodiment, assignment of a new logical channel number to a second event includes storing a reference to the second event information table and a reference to the first logical channel number table (or a derivative thereof). The tables and the additional association data can be stored in the memory 204 in the mobile device 130 of FIG. 2.

Next, in block 640, the EPG is displayed to a user. The EPG can comprise a graphical user interface which enables the display of program titles and other metadata. EPG data can be displayed on a grid with the option to select more information on each event. Radio EPGs can offer text-based displays of program name, description, genre, on-air or off-air, artist, album, track title, etc.

The logical channel numbers can be displayed in an order consistent with the order of logical channel numbers from the first distribution system. As shown in FIG. 3C, additional logical channel numbers can be displayed. Similarly, as described above with respect to FIG. 3C, unavailable channels can be hidden. The display can also include an indicia of the first logical channel number associated with the event. The association can be displayed by virtue of sharing a row or column of the grid. For example, as shown in FIG. 3C, the logical channel number or a name associated with the logical channel number can be displayed as part of the EPG. The indicia can also include call letters or a logo.

Although the illustrated program guides of FIGS. 3 and 5 are shown as a grid, other EPGs can be displayed. For example, when tuned to a particular logical channel number, the EPG may be simplified to only show events associated with that logical channel number, or only the event associated with that logical channel number and the current time.

Figure 7:
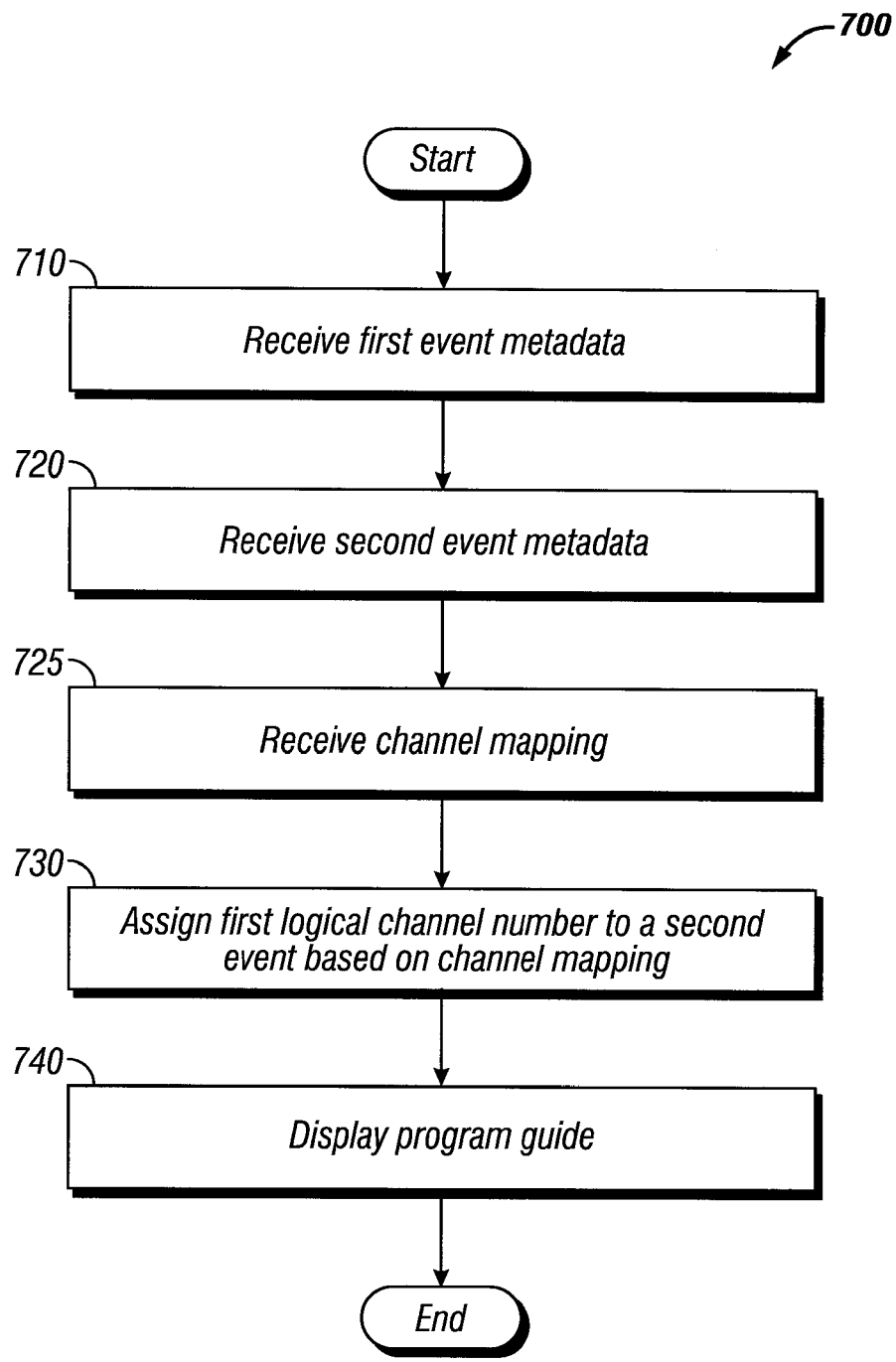
FIG. 7 is a flowchart illustrating a method of displaying a program guide involving a channel mapping.

As described above, assignment of a logical channel number to a particular event can be based on a received channel mapping. FIG. 7 is a flowchart illustrating a method of displaying a program guide involving a channel mapping. The process 700 begins in blocks 710 and 720 with the system receiving first event metadata and second event metadata. These operations can be performed as described above with respect to blocks 610 and 620 of FIG. 6. In particular, the operations can be performed by the mobile device 130 of FIG. 2.

Continuing, in block 725, the process involves receiving a channel mapping. As described above with respect to blocks 610 and 620 of FIG. 6, the receptions in block 710 and 720 can be performed in either order, simultaneously, or during overlapping time intervals. Similarly, the reception in block 725 can occur prior to receiving the event metadata, after receiving event metadata, along with the first event metadata, along with second event metadata, along with both the first and second event metadata, or during a time interval overlapping the reception of one or both of the first and second event metadata. As described with respect to the reception in blocks 610 and 620 of FIG. 6, the reception of a channel mapping can be performed, in one embodiment, by the mobile device 130 of FIG. 1. In other embodiments, the performing system can be a home entertainment system.

In other embodiments, the channel mapping is received from the first or second distribution system 120, 125 of FIG. 1. In another embodiment, the channel mapping is retrieved by the mobile device 130 from a third party 'metadata aggregator' or downloaded from the Internet. In one embodiment, the mobile device 130 of FIG. 2, receives the channel mapping via the communications link 123 through the receiver 224 and network interface 208. In another embodiment, the channel mapping is retrieved from the memory 204 of the mobile device 103 of FIG. 2. Such a channel mapping retrieved from the memory 204 may have been received previously as described above, automatically generated by the mobile device 103, or programmed by a user of the mobile device 103.

The channel mapping associates a first set of logical channel numbers with a second set of logical channel numbers. The mapping is not necessarily one-to-one. For example, the channel mapping can map multiple logical channel numbers to a null value. As another example, the channel mapping can map two logical channel numbers from a first set to a single logical channel number of a second set. The channel mapping may be temporally based. For example, the channel mapping may designed that a first logical channel number from the first set be mapped to particular logical channel number during the hours of 9:00 am to 9:00 pm, but that a second logical channel number from the first set be mapped to the particular logical channel number during the hours of 9:00 pm to 9:00 am.

As described above with respect to FIGS. 4A and 4B, in one embodiment, the channel mapping is stored in a data structure as a parallel array, which associates each logical channel number in a current network to logical channel number of a home network. The mapping may be based, for example, on an associated network or name associated with the logical channel number. Thus, although CW (6) of the EPG of FIG. 3A is different from CW (3) of the EPG of FIG. 3B, they are associated with each other via the channel mapping. In some cases, similar logical channel numbers will be unavailable in two different distribution systems. For example, NBC (4) of the EPG of FIG. 3A has no corresponding logical channel number in the EPG of FIG. 3B. In this case, the channel mapping may associate the logical channel number with a null value or simply not associate it at all. As another example, ABC (2) of the EPG of FIG. 3B has no corresponding logical channel number in the EPG of FIG. 3A. In this case, the channel mapping may associate the logical channel number with reserved 'roaming' logical channel numbers or simply not associate it at all.

The mapping may also be based on other characteristics of the logical channel numbers. For example, the Fox Sports Network may be available as logical channel number 20 in a first distribution network, but unavailable in a second distribution network, whereas ESPN (formerly standing for Entertainment and Sports Programming Network) is unavailable is the first distribution network, but available as logical channel number 5 in the second distribution network. The channel mapping may associate these two logical channel numbers by virtue of their similar programming (e.g., sports), despite the difference in name and affiliation.

The channel mapping can be provided by a content provider 110 or a distribution system 120, 125 of FIG. 1. The channel mapping may be generated automatically by the distribution system 120, 125 or manually programmed by an operator of the distribution system 120, 125.

Once the first and second event metadata is received in block 710 and 720 of FIG. 7, each event metadata including information regarding a set of logical channel numbers, and the channel mapping is also received in block 725, the process 700 moves to block 730 where the system assigns the first logical channel number of a particular first event to a particular second event based on the channel mapping. As described above with respect to block 630 of FIG. 6, the assignment can be performed by the mobile device 130 of FIG. 1, the media guide module 134 of FIG. 1, or the processor 202 of FIG. 2.

In one embodiment, the assignment of block 730 is performed for all, or nearly all, of the second events for which second event metadata is received. Each second event is selected, in turn, and the second logical channel number associated therewith is determined. The channel mapping is consulted to determine the first logical channel number associated with the second logical channel number. The first logical channel number associated with the second logical channel number by the channel mapping is then assigned to the second event associated with the second logical channel number.

Next, in block 740, an EPG based on the second events with the assigned first logical channel numbers is displayed. The EPG can comprise a graphical user interface which enables the display of program titles and other metadata. EPG data can be displayed on a grid with the option to select more information on each event.

The logical channel numbers can be displayed in an order consistent with the order of logical channel numbers from the first distribution system. As shown in FIG. 3C, additional logical channel numbers can be displayed. Similarly, as described above with respect to FIG. 3C, unavailable channels can be hidden. The display can also include an indicia of the first logical channel number associated with the event. Further, the display can also include an indicia of the second logical channel number originally associated with the event, or with an indicia thereof. The association can be displayed by virtue of sharing a row or column of the grid. For example, as shown in FIG. 3C, the logical channel number or a name associated with the logical channel number can be displayed as part of the EPG. The indicia can also include call letters or a logo.

Figure 8:
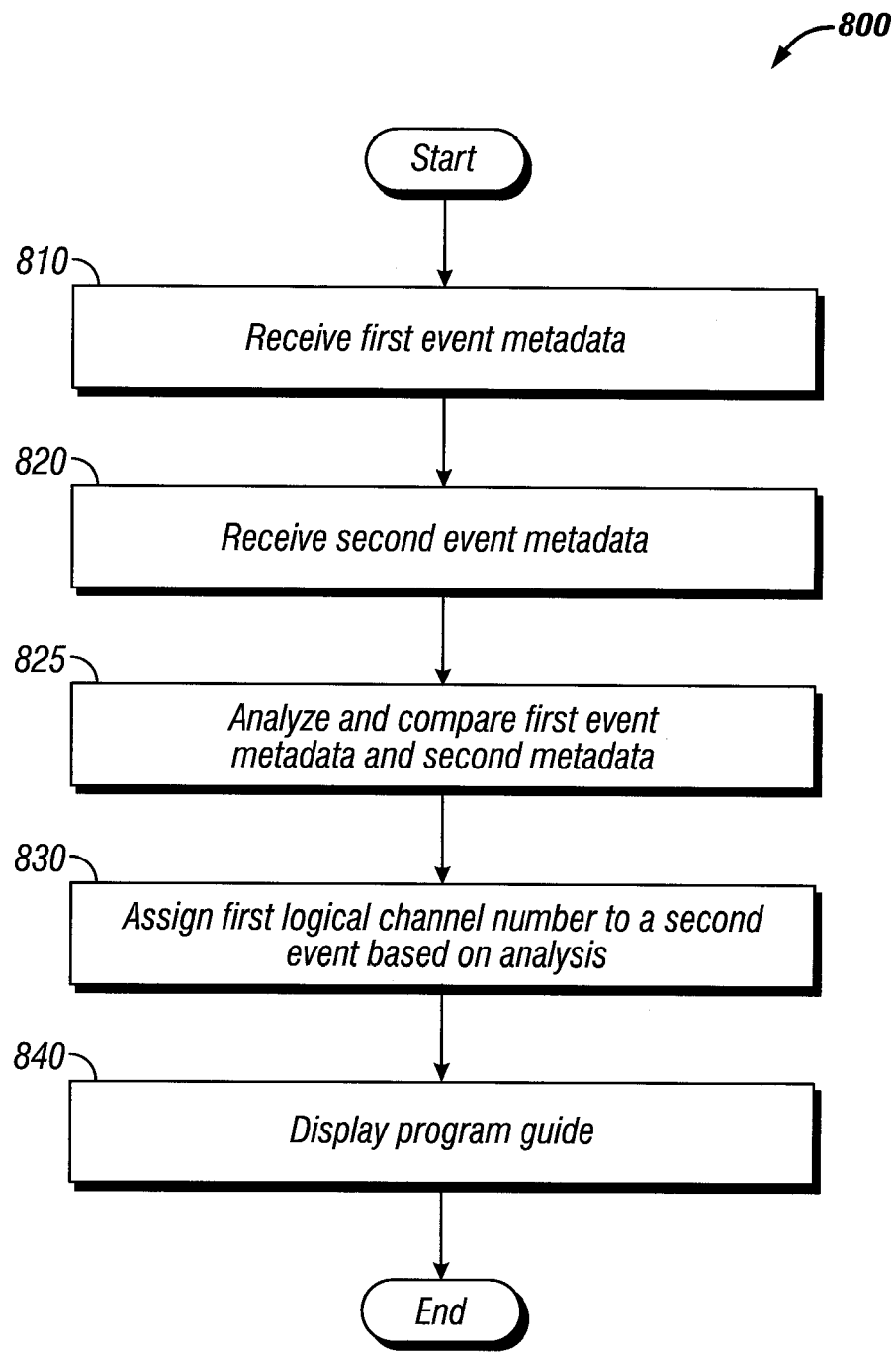
FIG. 8 is a flowchart illustrating a method of displaying a program guide involving a comparison of first and second event metadata.

As described above, assignment of a logical channel number to a particular event can be based on an analysis or comparison of event metadata. FIG. 8 is a flowchart illustrating a method of displaying a program guide involving a comparison of first and second event metadata. The process 800 begins in blocks 810 and 820 with the system receiving first event metadata and second event metadata. These operations can be performed as described above with respect to blocks 610 and 620 of FIG. 6. In particular, the operations can be performed by the mobile device 130 of FIG. 2.

Continuing, in block 825, the process involves analysis and comparison of first event data and second event metadata. In one embodiment, the analysis is performed by the mobile device 130 in FIG. 1, or the program guide module 134 thereof. In another embodiment, the analysis is performed by processor 202 of FIG. 2, or a sub-module thereof.

The analysis and/or comparison of the first and second metadata can be performed in a number of ways. In one embodiment, each first event for which first event metadata is received (in block 810) is compared to each second event for which first event metadata is received (in block 820) in order to find a "best match." The best-matched second event can be chosen based on a number of factors, including algorithms involving many different factors.

In one embodiment, each first event is compared to each second event by correlating a title associated with the first event via the first event metadata with a title associated with the second event via the second event metadata so as to create a match value. The particular second event with the highest match value would be considered the "best match" for the particular first event. For example, the first event in FIG. 5A entitled "Chuck" at 8:00 pm on logical channel number 4 would have a high match value when compared to the second event in FIG. 5B entitled "Chuck" at 8:00 pm on logical channel number 3. Although an exact match would likely have a high match value, high match values could also be obtained for close matches such as "The Big Bang Theory" with "Big Bang Theory" or even, "Big Bang." Similarly, "Terminator: The Sarah Connor Chronicles" might yield a high match value when compared to a short title, like "Terminator," or a related movie, like "Terminator 2."

In another embodiment, each first event is compared to each second event by correlating a genre associated with the first event via the first event metadata with a genre associated with the second event via the second event metadata so as to create a match value. The particular second event with the closest matching genre, or genre code if stored numerically, would be considered the "best match" for the particular first event. For example, the first event in FIG. 5A entitled "Gossip Girl" at 8:00 on logical channel number 6, which is associated with a "Drama" genre, may yield a high match value when compared to the second event in FIG. 5B entitled "Grey's Anatomy" at 9:00 on logical channel number 3, which is similarly associated with a "Drama" genre. In other embodiments, the match may not necessarily be an exact match to yield a high match value. In the example above, "Gossip Girl" may be associated with a "Drama—Teen" genre, whereas "Grey's Anatomy" is associated with a "Drama—Medical" genre, yet a comparison could still yield a high match value on account of the shared "Drama" component.

In another embodiment, each first event is compared to each second event so as to generate a match value using multiple factors, such as title and genre. In some embodiments, the match value is a binary variable indicating either the presence of a match or the absence of a match.

In some instances, for a particular first event, the resultant match value when the first event is compared to two different second events will be the same. For example, the first event entitled "Antiques Roadshow" at 9:00 pm on logical channel 9, could yield an equally high match value for the second events entitled "Antiques Roadshow" at 8:00 pm and 9:00 pm on logical channel 4. In some embodiments, one of the two different second events is selected as the "best match" for the particular first event. In other embodiments, both events are selected as equally relevant "best matches," such as described with respect to FIG. 5C.

After the analysis and comparison, the process 700 moves to block 730 where the system assigns the first logical channel number of a particular first event to a particular second event based on the channel mapping. As described above with respect to block 630 of FIG. 6, the assignment can be performed by the mobile device 130 of FIG. 1, the media guide module 134 of FIG. 1, or the processor 202 of FIG. 2.

In one embodiment, the assignment of block 830 is performed for all, or nearly all, of the first events for which first event metadata is received. Each first event is selected, in turn, and the first logical channel number associated therewith is determined. The second event which yields the highest match value when compared to the particular first event is reassigned the first logical channel number associated with the particular first event.

In some embodiments, the particular second event is also reassigned the start time associated with the particular first event. In order to display the second event as the reassigned start time, the system can store the second event. In one embodiment, the second event is stored in memory 204 of FIG. 2. Additional events which are not the "best match" for any particular first event may also be reassigned logical channel numbers. In one embodiment, non-matching events are assigned to designated 'roaming' channels.

Next, in block 840, an EPG based on the second events with the assigned first logical channel numbers is displayed. The EPG can comprise a graphical user interface which enables the display of program titles and other metadata. EPG data can be displayed on a grid with the option to select more information on each event.

The logical channel numbers can be displayed in an order consistent with the order of logical channel numbers from the first distribution system. As shown in FIG. 5C, additional logical channel numbers can be displayed. Similarly, as described above with respect to FIG. 5C, unavailable channels can be hidden. The display can also include an indicia of the first logical channel number associated with the event. Further, the display can also include an indicia of the second logical channel number originally associated with the event, or with an indicia thereof. The association can be displayed by virtue of sharing a row or column of the grid. For example, as shown in FIG. 5C, the logical channel number or a name associated with the logical channel number can be displayed as part of the EPG. The indicia can also include call letters or a logo.

While the above detailed description has shown, described, and pointed out novel features of the invention as applied to various aspects, it will be understood that various omissions, substitutions, and changes in the form and details of the device or process illustrated may be made by those skilled in the art without departing from the scope of this disclosure. As will be recognized, the invention may be embodied within a form that does not provide all of the features and benefits set forth herein, as some features may be used or practiced separately from others. The scope of this disclosure is defined by the appended claims, the foregoing description, or both. All changes which come within the meaning and range of equivalency of the claims are to be embraced within their scope.

What is claimed is:

1. A method of displaying a program guide on a mobile device, the method comprising:
    receiving, in a first wireless broadcast at a first location, for a plurality of first events, first event metadata comprising a first event description, a first event start time, and a first logical channel number;
    receiving, in a second wireless broadcast at a second location, for a plurality of second events, second event metadata comprising a second event description, a second event start time, and a second logical channel number;
    associating at least one of the plurality of second events to a particular first event;
    assigning the first logical channel number and first event start time of the particular first event to the at least one of the plurality of second events associated with the particular first event;
    determining whether more than one of the plurality of second events are associated with the particular first event;
    selecting one of the more than one of the plurality of second events associated with the particular first event based on usage tracking information stored on the mobile device in response to determining that more than one of the plurality of second events are associated with the particular first event, wherein the usage tracking information comprises events a user of the mobile device has previously consumed on the mobile device;
    determining whether the at least one of the plurality of second events associated with the particular first event has a second event start time different than the particular first event's first event start time; and
    displaying a program guide comprising:
        at least a portion of the second event metadata for each of the at least one of the plurality of second events associated with the particular first event, arranged according to the first logical channel number and first event start time of the particular first event, wherein only metadata for the selected second event is displayed from among the more than one of the plurality of second events associated with the particular first event in response to determining that more than one of the plurality of second events are associated with the particular first event; and
        an indication of the second event start time for each of the at least one of the plurality of second events associated with the particular first event that is determined to have a second start time different than the particular first event's first event start time, wherein each of the at least one of the plurality of second events associated with the particular first event that is determined to have the second event start time different than the particular first event's first event start time is displayed in the program guide at the first event start time but is only available for consumption at the indicated second event start time.

2. The method of claim 1, wherein the program guide further comprises an indicator of the first logical channel number associated with the particular first event.

3. The method of claim 2, wherein the indicator of the first logical channel number associated with the particular first event comprises at least one of: the first logical channel number, a name of a network associated with the first logical channel number, call letters of a network associated with the first logical channel number, or a logo of a network associated with the first logical channel number.

4. The method of claim 1, wherein the assignment is based on the first logical channel number associated with the particular first event and the second logical channel number associated with the at least one of the plurality of second events.

5. The method of claim 1, further comprising receiving a channel mapping comprising at least one association between the first logical channel number and the second logical channel number.

6. The method of claim 5, wherein the assignment comprises assigning the first logical channel number associated, via the channel mapping, with the second logical channel number associated with the at least one of the plurality of second events.

7. The method of claim 1, wherein the assignment is based on the first event description of the particular first event and the second event description of the at least one of the plurality of second events.

8. The method of claim 1, wherein the assignment is based on a network associated with the particular first event and a network associated with the at least one of the plurality of second events.

9. The method of claim 1, further comprising storing the at least one of the plurality of second events associated with the particular first event at the second event start time of the at least one of the plurality of second events and displaying the at least one of the plurality of second events at the particular first event's first event start time.

10. The method of claim 1, further comprising comparing the first and second event metadata so as to generate at least one match value, wherein the assignment is based on the at least one match value.

11. The method of claim 1, wherein the first event metadata is received from a first distribution system and the second event metadata is received from a second distribution system.

12. The method of claim 11, wherein the first distribution system is associated with a first geographical area and the second distribution system is associated with a second geographical area, wherein the first and second geographical areas are non-overlapping.

13. The method of claim 1, further comprising storing the first event metadata prior to receiving the second event metadata, wherein assigning the first logical channel number is based on the stored first event metadata.

14. The method of claim 13, further comprising relocating from the first location to the second location prior to receiving the second event metadata.

15. A system for displaying a program guide, the system comprising:
  a receiver configured
    to receive, in a first wireless broadcast at a first location, for a plurality of first events, first event metadata comprising a first event description, a first event start time, and a first logical channel number; and
    to receive, in a second wireless broadcast at a second location, for a plurality of second events, second event metadata comprising a second event description, a second event start time, and a second logical channel number;
  a memory; and
  a processor coupled to the memory and the receiver and configured to:
    associate at least one of the plurality of second events to a particular first event;
    assign the first logical channel number and first event start time of the particular first event to the at least one of the plurality of second events associated with the particular first event;
    determine whether more than one of the plurality of second events are associated with the particular first event;
    select one of the more than one of the plurality of second events associated with the particular first event based on usage tracking information stored in the system in response to determining that more than one of the plurality of second events are associated with the particular first event, wherein the usage tracking information comprises events a user has previously consumed on the system; and
    determine whether the at least one of the plurality of second events associated with the particular first event has a different start time than the particular first event, and a display coupled to the receiver and the processor and configured to:
      display a program guide comprising:
        at least a portion of the second event metadata for each of the at least one of the plurality of second events associated with the particular first event, arranged according to the first logical channel number and first event start time of the particular first event, wherein only metadata for the selected second event is displayed from among the more than one of the plurality of second events associated with the particular first event in response to determining that more than one of the plurality of second events are associated with the particular first event; and
        an indication of the second event start time for each of the at least one of the plurality of second events associated with the particular first event that is determined to have a different start time than the particular first event, wherein each of the at least one of the plurality of second events associated with the particular first event that is determined to have a different start time than the particular first event is displayed in the program guide at the first event start time but is only available for consumption at the indicated second event start time.

16. The system of claim 15, wherein the memory is configured to store at least one of the first event metadata, the second event metadata, or the program guide.

17. The system of claim 16, wherein the memory is further configured to store at least one of the plurality of first or second events.

18. The system of claim 16, wherein the memory is configured to store the first event metadata, and wherein the processor is configured to assign the first logical channel number based on the stored first event metadata.

19. The system of claim 15, wherein the receiver is further configured to receive a channel mapping.

20. The system of claim 19, wherein the processor is configured to assign the first logical channel number based on the channel mapping.

21. The system of claim 15, wherein the processor is further configured to analyze the first and second event metadata so as to generate at least one match value and to assign the first logical channel number on the basis of the at least one match value.

22. The system of claim 15, wherein the system is embodied as a consumer electronics item.

23. The system of claim 15, wherein the receiver is configured to receive the first event metadata while located in a first geographical area and to receive the second event metadata while located in a second geographical area, wherein the first and second geographical area are non-overlapping.

24. A system for displaying a program guide, the system comprising:
  means for receiving, in a first wireless broadcast at a first location, for a plurality of first events, first event metadata comprising a first event description, a first event start time, and a first logical channel number;
  means for receiving, in a second wireless broadcast at a second location, for a plurality of second events, second event metadata comprising a second event description, a second event start time, and a second logical channel number;
  means for associating at least one of the plurality of second events to a particular first event;
  means for assigning the first logical channel number and first event start time of the particular first event to the at least one of the plurality of second events associated with the particular first event;

means for determining whether more than one of the plurality of second events are associated with the particular first event;
means for selecting one of the more than one of the plurality of second events associated with the particular first event based on usage tracking information stored on the system in response to determining that more than one of the plurality of second events are associated with the particular first event, wherein the usage tracking information comprises events a user has previously consumed on the system;
means for determining whether the at least one of the plurality of second events associated with the particular first event has a different start time than the particular first event; and
means for displaying a program guide, wherein the program guide comprises:
    at least a portion of the second event metadata for each of the at least one of the plurality of second events associated with the particular first event, arranged according to the first logical channel number and first event start time of the particular first event, wherein only metadata for the selected second event is displayed from among the more than one of the plurality of second events associated with the particular first event in response to determining that more than one of the plurality of second events are associated with the particular first event; and
    an indication of the second event start time for each of the at least one of the plurality of second events associated with the particular first event that is determined to have a second start time different than the particular first event's first event start time, wherein each of the at least one of the plurality of second events associated with the particular first event that is determined to have a different start time than the particular first event is displayed in the program guide at the first event start time but is only available for consumption at the indicated second event start time.

25. The system of claim 24, wherein the means for receiving first event metadata comprises an antenna, wherein the means for receiving second event metadata comprises an antenna, wherein the means for assigning comprises a processor, and wherein the means for displaying comprises a display.

26. A non-transitory computer-readable storage medium having stored thereon processor executable instructions configured to cause a processor of a computing device to perform operations comprising:
receiving, in a first wireless broadcast at a first location, for a plurality of first events, first event metadata comprising a first event description, a first event start time, and a first logical channel number;
receiving, in a second wireless broadcast at a second location, for a plurality of second events, second event metadata comprising a second event description, a second event start time, and a second logical channel number;
associating at least one of the plurality of second events to a particular first event;
assigning the first logical channel number and first event start time of the particular first event to the at least one of the plurality of second events associated with the particular first event;
determining whether more than one of the plurality of second events are associated with the particular first event;
selecting one of the more than one of the plurality of second events associated with the particular first event based on usage tracking information stored on the computing device in response to determining that more than one of the plurality of second events are associated with the particular first event, wherein the usage tacking information comprises events a user has previously consumed on the computing device;
determining whether the at least one of the plurality of second events associated with the particular first event has a different start time than the particular first event; and
displaying a program guide, wherein the program guide comprises:
    at least a portion of the second event metadata for each of the at least one of the plurality of second events associated with the particular first event, arranged according to the first logical channel number and first event start time of the particular first event, wherein only metadata for the selected second event is displayed from among the more than one of the plurality of second events associated with the particular first event in response to determining that more than one of the plurality of second events are associated with the particular first event; and
    an indication of the second event start time for each of the at least one of the plurality of second events associated with the particular first event that is determined to have a second start time different than the particular first event's first event start time, wherein each of the at least one of the plurality of second events associated with the particular first event that is determined to have a different start time than the particular first event is displayed in the program guide at the first event start time but is only available for consumption at the indicated second event start time.

\* \* \* \* \*